April 26, 1938.   T. E. SCHLEY ET AL   2,115,430
HEADER BOX FACING TOOL
Filed June 20, 1936
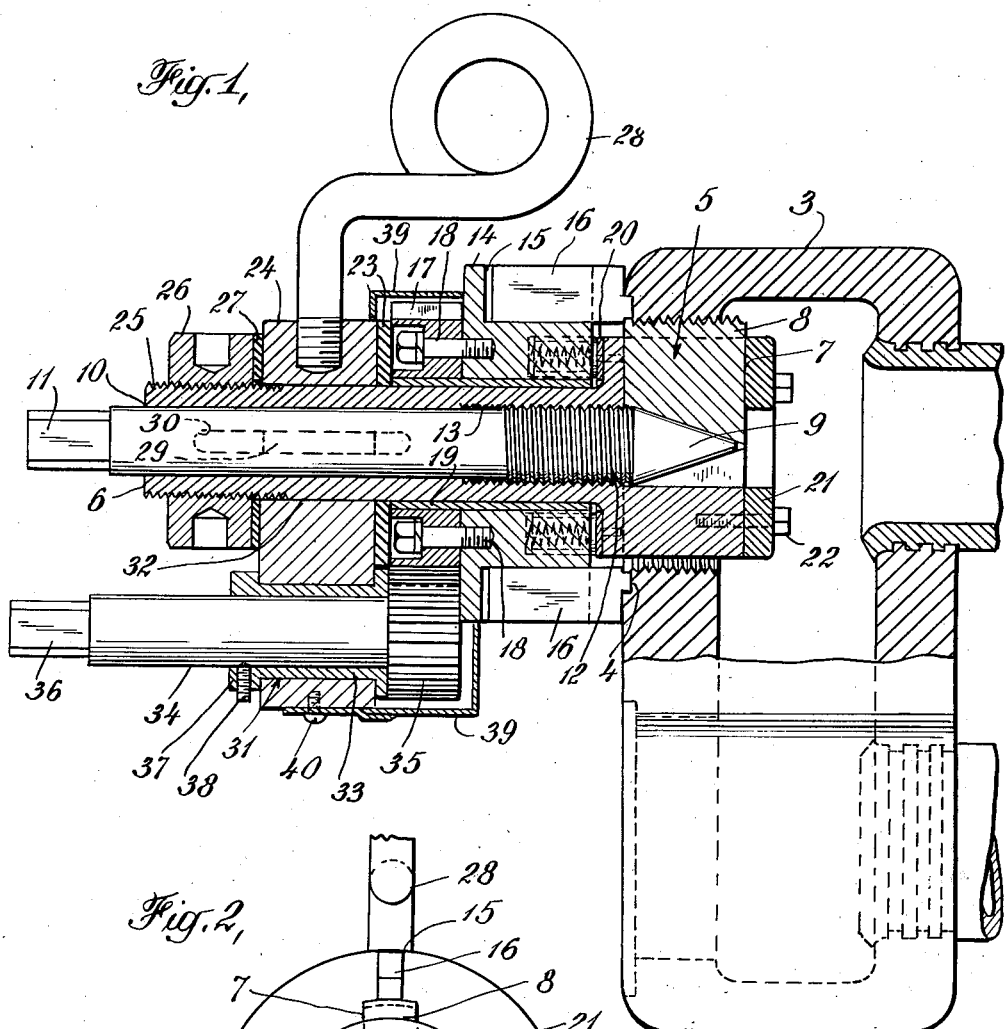
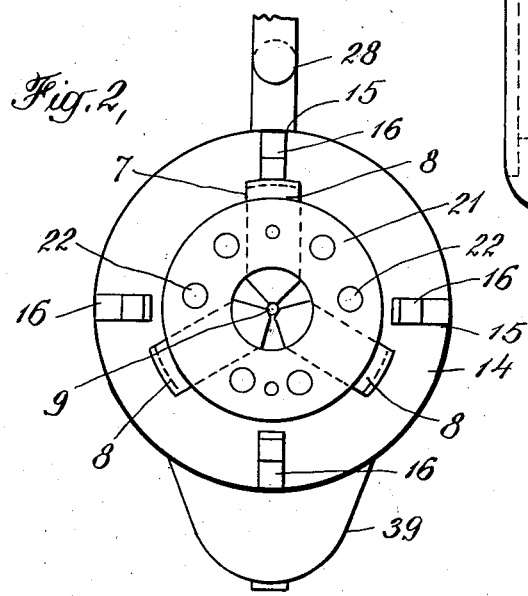

Patented Apr. 26, 1938

2,115,430

UNITED STATES PATENT OFFICE

2,115,430

HEADER BOX FACING TOOL

Thomas E. Schley, John R. Chenall, and Eddie R. Kehrer, Beaumont, Tex., assignors to Socony-Vacuum Oil Company, Incorporated, New York, N. Y., a corporation of New York Application June 20, 1936, Serial No. 86,324

1 Claim. (Cl. 90—14)

Oil heaters used in the petroleum refining industry are composed of a number of tubes, usually 3, 4, or 5 inches outside diameter, placed upon the sidewalls, and under the roof of the combustion chamber of a pipe still, and in the convection section thereof. To accomplish the arrangement of these pipes in an endless coil, the pipe ends pass through the wall of the furnace and adjacent pipes are connected by having their ends rolled into a forged steel "header box", which forms a return bend fitting. In order to have access to the interior of the tubes for cleaning, these header boxes are fitted with threaded openings opposite the tube ends, and threaded plugs are run thereinto for closure. To secure proper leakproof closure, these threaded plugs are frequently fitted so that they make up, with or without a gasket, upon a faced portion, or seat ring upon the outside surface of the header box. In the necessary operations of cleaning, these faced or machined areas around the threaded plug orifice become damaged and must be refaced to secure tight closure. This invention is directly concerned with a novel machine for accomplishing such refacing, which is adaptable, however, for any operation of facing to be carried out adjacent a threaded aperture.

This invention has for its object the provision of a tool capable of being used for facing a surface adjacent a threaded aperture and comprising threaded chucks for insertion in such aperture cooperating with a facing, machining, or counterboring tool capable of rotation about a shaft concentric with and supported by such chucks.

In order that this facing tool may be more readily described, reference is now made to the drawing attached to this specification, showing, in Figure 1, an assembly, in section, of the tool, in operating position in a header to be faced. In Figure 2 of the drawing is shown an end view of the facing tool, assembled. In Figure 1, 3 designates the header box, shown in section, and 4 the area thereon which is to be faced. The facing tool is composed of a tool body 5, having a rearwardly extending neck 6, and in the enlarged head of which there are three radial slots 7. In each of these radial slots 7 there is placed an expanding jaw 8, the outer end of which is properly threaded to engage the threads in the threaded opening in the header box 3. The expanding jaws are retained in place by means of the plate 21, attached to the tool body 5 by screws 22. These three expanding jaws 8 are forced outward by a tapered mandrel 9, the conical point of which engages their tapered bases. This mandrel 9 extends through the bore 10 in the tool body neck 6, and its outboard end is finished with a wrench square 11. The mandrel 9 is positioned and maintained in position by a threaded portion 12, cooperating with threads 13 on the inner end of the bore 10 in the tool body 5. Externally upon tool body neck 6 there is mounted a facing tool head 14, having the form of a cylindrical block, and in a plurality of radial slots 15, in that tool head, there are mounted facing tools 16, which may be held in place by set screws, or other convenient device. Upon the back side of this tool head 14, there is a gear 17, non-rotatably secured to the tool head by a plurality of screws 18. The tool head 14 and gear 17 are rotatable about the neck 6 of the tool body 5, and are bushed therefrom by a brass bushing 19. Thrust between tool head 14 and the enlarged portion of the tool body is cared for by thrust washer 20. Mounted upon tool body neck 6, rearwardly of the gear 17, and separated therefrom by thrust washer 23, is a sliding block 24. The outboard end of tool body neck 6 is threaded at 25, and cooperating with this threaded portion is feed nut 26, separated from sliding block 24 by a thrust washer 27. When feed nut 26 is tightened, its motion along the tool body neck 6, transmitted through thrust washer 27, sliding block 24, and thrust washer 22 to gear 18 and tool head 14, forces the facing tools 16 against the work. For convenient support of the tool, which is quite heavy in the larger sizes, a suspension ring 28, formed of steel rod, is attached to sliding block 24 as shown. Sliding block 24 is keyed to tool body neck 6, to prevent relative rotation therebetween by a key 29 working in a keyway 30 cut in the tool body neck 6. Sliding block 24 is somewhat elliptical in shape, and has another passage in it, viz, 31, parallel to the passage 32 through which tool body neck 6 passes. Passage 31 is bushed with a bushing 33, and in passage 31 is mounted a driving shaft 34, whose inboard end terminates in a pinion 35 engaging gear 17 and whose outboard end terminates in a square, or taper key or other form, at 36, suitable for connection to a source of power for driving the tool. Shaft 34 is secured in place by a collar 37, fixed by set-screw 38. The gear 17 and pinion 35 are encased in a light sheet metal guard 39, secured to sliding block 24 by a plurality of screws 40. The method of operation of the machine will be evident from the detailed description.

It will be evident that the tool may be used for any operation of machining on the surface immediately surrounding a threaded hole, of any size, and such other operations are contemplated herein as being broadly covered by the term "spot facing."

We claim:

1. A milling tool for spot facing around an interiorly threaded opening comprising a tubular tool body exteriorly threaded upon one end and having in the opposite end a plurality of radially disposed axial slots, and an interiorly threaded portion adjacent said slots; toothed slips radially movable in said slots the teeth thereof comprising portions of a male thread adapted to engage the thread of the opening in the spot faced article; an expanding mandrel extending through the tool body, engaging said interior threads and operable to radially expand said slips; a tool head rotatably and slidably mounted upon said tool body, with milling cutters axially disposed on said tool head and a ring gear affixed thereto; a frame surrounding said tool body and slidably mounted thereon, a shaft carried by said frame and on said shaft a pinion engaging said ring gear; and a feed nut, traveling upon the exterior threads on said tool body, adapted to thrust the frame and through it the tool head along said tool body into engagement with the work.

THOMAS E. SCHLEY.
JOHN R. CHENALL.
EDDIE R. KEHRER.